(12) United States Patent
McCallum et al.

(10) Patent No.: US 9,825,441 B2
(45) Date of Patent: Nov. 21, 2017

(54) ELECTRICAL WIRING INSTALLATION SYSTEM

(71) Applicant: PacRim Technologies, LLC, Kirkland, WA (US)

(72) Inventors: Jill McCallum, Kirkland, WA (US); Logan McCallum, Kirkland, WA (US); Mathew Busch, Kirkland, WA (US); Anthony Joseph Basile, Kirkland, WA (US)

(73) Assignee: PacRim Technologies, LLC, Kirkland, WA (US)

( * ) Notice: Subject to any disclaimer, the term of this patent is extended or adjusted under 35 U.S.C. 154(b) by 0 days.

(21) Appl. No.: 15/219,056

(22) Filed: Jul. 25, 2016

(65) Prior Publication Data

US 2017/0033541 A1 Feb. 2, 2017

Related U.S. Application Data

(60) Provisional application No. 62/197,217, filed on Jul. 27, 2015.

(51) Int. Cl.
*H02G 3/02* (2006.01)
*H02G 3/04* (2006.01)

(52) U.S. Cl.
CPC ............ *H02G 3/02* (2013.01); *H02G 3/0475* (2013.01)

(58) Field of Classification Search
USPC .......................................... 248/220; 174/135
See application file for complete search history.

(56) References Cited

U.S. PATENT DOCUMENTS

| 6,040,525 | A | * | 3/2000 | Chauquet | H01R 4/363 174/40 CC |
| 6,685,232 | B2 | * | 2/2004 | Sampson | F16B 39/108 285/190 |

* cited by examiner

*Primary Examiner* — Dhirubhai R Patel
(74) *Attorney, Agent, or Firm* — Perkins Coie LLP

(57) ABSTRACT

Apparatus, systems, and methods related to an electrical wiring installation system that has a clip assembly and at least one post coupleable to the clip assembly. The clip assembly has an upper member with a first clamping surface and a threaded receptacle, and a lower member with a second clamping surface and an aperture. The upper member and the lower member are mateable such that the first clamping surface faces the second clamping surface. The post includes a base with a wire engagement member and a threaded shaft extending from the base. The threaded shaft is configured to pass through the aperture of the lower member of the clip assembly and threadably mate with the threaded receptacle of the upper member of the clip assembly.

18 Claims, 18 Drawing Sheets

ELECTRICAL WIRING INSTALLATION SYSTEM

CROSS-REFERENCE TO RELATED APPLICATION

This application hereby claims priority to U.S. Provisional Patent Application No. 62/197,217, titled "Electrical Wiring Installation System," filed Jul. 27, 2015, which is incorporated by reference herein in its entirety.

TECHNICAL FIELD

The present invention relates generally to a line support system, such as an electrical wiring installation system for aerospace and other applications.

BACKGROUND

Aircraft and other vehicles, including aerospace vehicles, marine vehicles, land vehicles, space vehicles, etc., include many wires and other lines extending through the vehicle. These wires are typically supported on clamps secured to the airframe. Conventional clamps are injection molded and include metallic attachment members, such as mateable threads and grooves. Conventional clamps each experience drawbacks, such as difficulty of installation and use, as well as requiring costly manufacturing processes.

SUMMARY

Embodiments of the present technology provide a line support system that overcomes drawbacks experienced in the prior art and that provides additional benefits. As an example, at least one aspect of the present technology provides a line support system, such as an electrical wiring installation system. The system includes a clip assembly having an upper member with a first clamping surface and a threaded receptacle, and a lower member with a second clamping surface and an aperture. The upper member and the lower member are mateable such that the first clamping surface faces the second clamping surface and the aperture is substantially aligned with the threaded receptacle. The system also includes a post comprising a base having a wire engagement member, and a threaded shaft extending from the base. The threaded shaft is configured to pass through the aperture of the lower member of the clip assembly and threadably mate with the threaded receptacle of the upper member of the clip assembly, thereby clamping the lower member between the base and the upper member.

Another aspect of the present technology provides a line installation system comprising a clip assembly with first and second clip members. The first clip member has a first clamping surface and a threaded receptacle. The second clip member has a second clamping surface and an aperture, wherein the first and second clip members are mateable with the first clamping surface facing the second clamping surface and the aperture substantially aligned with the threaded receptacle. The system has a post releasably connectable to the clip assembly to hold the first and second clip members together. The post comprises a base having a wire engagement member, and a threaded shaft extends from the base and is configured to pass through the aperture of the second clip member of the clip assembly and threadably mate with the threaded receptacle of the first clip member of the clip assembly.

Another embodiment provides an electrical wiring installation system, comprising a clip assembly having comprising first and second clip members mateable together to secure the system to a mounting ledge. The first clip member has a threaded receptacle therein. The system has a post with a base having a wire engagement member, and a threaded shaft extends from the base. The threaded shaft is configured to screw into the threaded receptacle to releasably capture the second clip member between the base and the first clip member to hold the clip assembly together on a mounting structure.

Another aspect of the present technology provides an electrical wiring installation system. The system includes a clip assembly having upper and lower members mated together to secure the system to a mounting ledge. The lower member has an aperture aligned with a receptacle in the upper member, and the receptacle is at least partially threaded. The system also includes a post that includes a base having a wire engagement member and a threaded shaft extending from the base. The threaded shaft is configured to extend through the aperture and threadably engage the receptacle to secure the post to the clip assembly and to secure the upper and lower members of the clip assembly together.

Another aspect of the present technology provides a method of retaining an electrical wire in an electrical wiring installation system. The method comprises providing a clip assembly that has first and second clip members mateable together. The first clip has a threaded receptacle, and the second clip has an aperture substantially aligned with the threaded receptacle. The method includes providing a post releasably connectable to the clip assembly to hold the first and second clip members together. The post comprises a base having a wire engagement member, and a threaded shaft extending from the base. The threaded shaft is configured to pass through the aperture of the second clip member of the clip assembly and threadably mate with the threaded receptacle of the first clip member of the clip assembly to secure the post to the clip assembly and to secure the first and second clip members together. The method includes mating the first and second clip members together over opposing sides of a mounting ledge, and threading the threaded shaft of the post into the receptacle of the first clip member, thereby securing the post to the clip assembly and securing the first and second clip members together. The method includes coupling an electrical wire to the post.

Another embodiment provides a method of retaining an electrical wire in an electrical wiring installation system. The method includes providing a clip assembly that includes upper and lower members mated together, wherein the lower member has an aperture aligned with a receptacle in the upper member, and the receptacle is at least partially threaded. The method further includes providing a post that includes a base having a wire engagement member, and a threaded shaft extending from the base. The threaded shaft is configured to extend through the aperture and threadably engage the receptacle to secure the post to the clip assembly and to secure the upper and lower members of the clip assembly together. The method further includes mating the upper member and the lower member of the clip assembly together over opposing sides of a mounting ledge, and threading the threaded shaft of the post through the aperture and into the receptacle of the clip assembly, thereby securing the post to the clip assembly and securing the upper member and the lower member of the clip assembly together. The method further includes coupling an electrical wire to the post.

Appendix A includes additional views of a line installation system in accordance with one or more embodiments of the present technology.

DETAILED DESCRIPTION

The present disclosure describes a line support system, such as an electrical wiring installation system in accordance with certain embodiments of the present technology. Several specific details of the embodiments are set forth in the following description and Figures to provide a thorough understanding of the embodiments. One skilled in the art, however, will understand that the present technology may have additional embodiments, and that other embodiments of the technology may be practiced without several of the specific features described below. Further, one skilled in the art will recognize that the system described herein could be configured in many different arrangements and embodiments. Such variations of the present disclosure may be utilized without deviating from the spirit and scope of the present invention. The various embodiments set forth below are described and shown with a level of detail to provide a thorough understanding of the disclosure. Other structures and systems that may be associated with electrical wiring installation systems have not been fully discussed to enable a clearer presentation of embodiments of this disclosure.

The embodiment of the line support system is described herein as an electrical wiring installation system for purposes of illustration, with reference to the relative spatial orientation of the electrical wiring installation system as shown in the Figures. The directional references regarding upper, lower, left, right, etc., however, are used to describe the assembly in the orientation as illustrated for ease of understanding. The directional orientation shown and described herein is not intended to limit the structure of the electrical wiring installation system. The electrical wiring installation system can be oriented in spatial orientations different than those shown in the Figures.

Figure 1A:
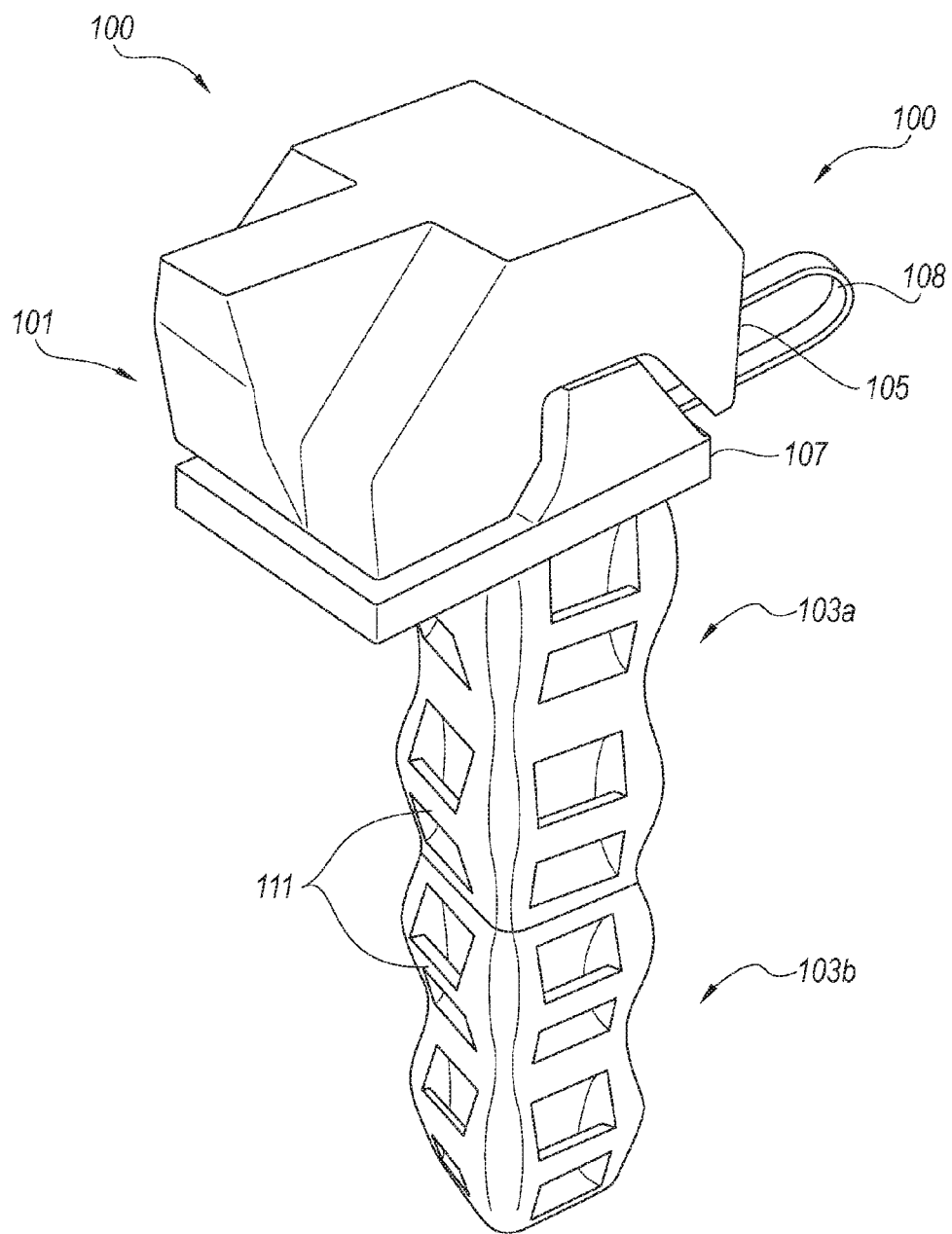
FIGS. 1A-1D are perspective, side, front, and exploded views, respectively, of an electrical wiring installation system in accordance with an embodiment of the present technology.
Figure 1B:
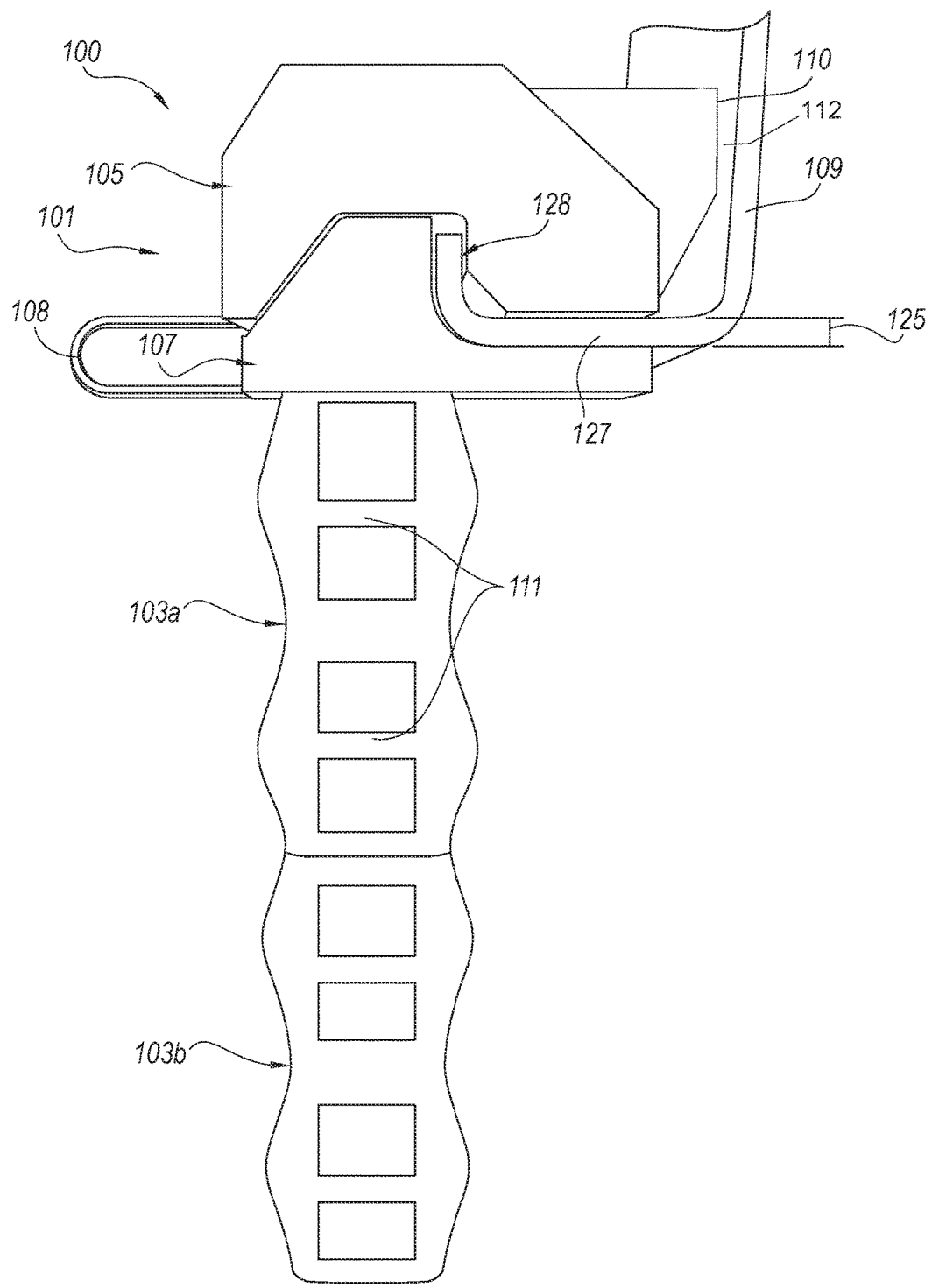
Figure 1C:
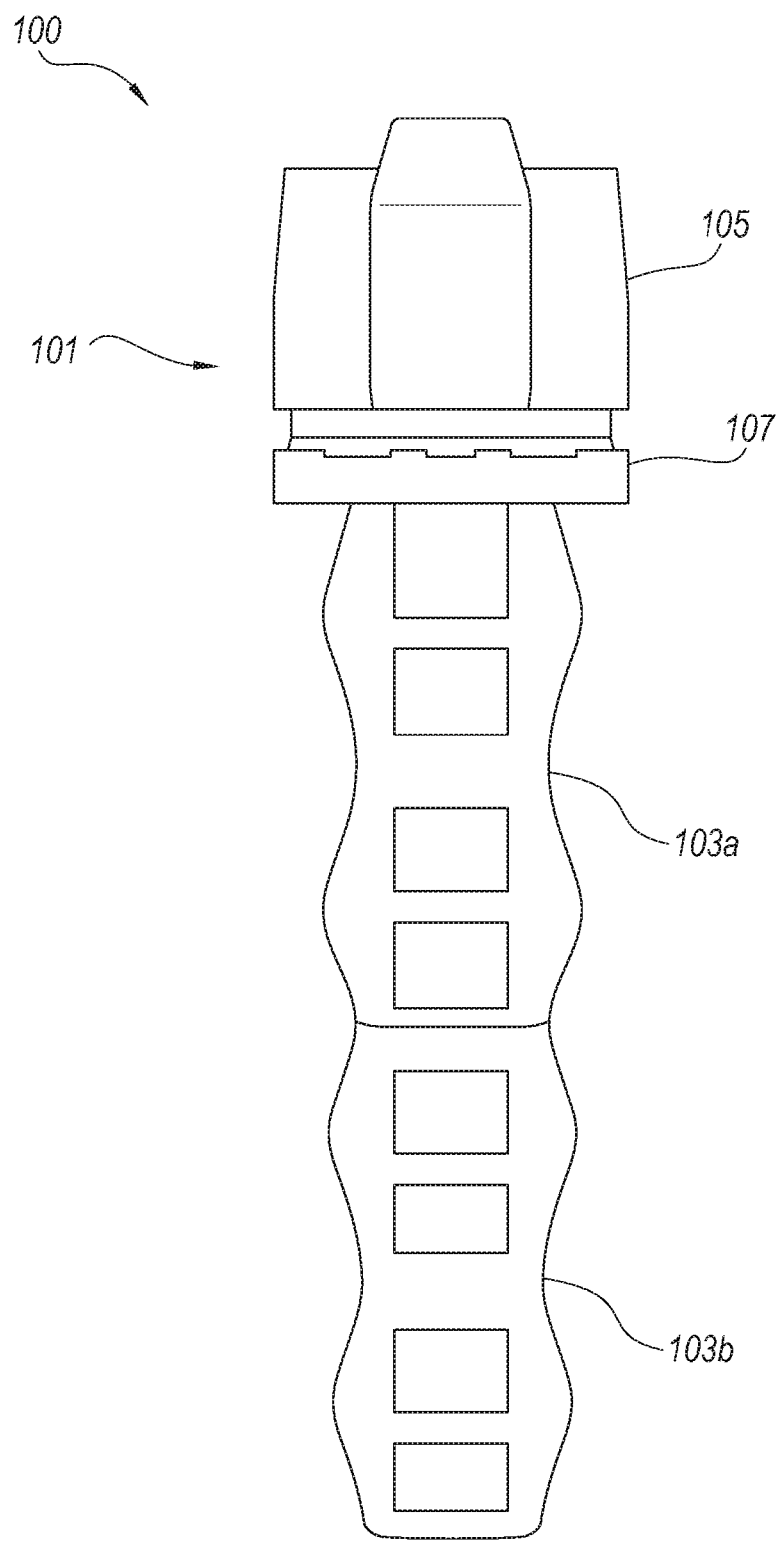

FIGS. 1A-1D are perspective, side, front, and exploded views, respectively, of an electrical wiring installation system 100 (hereinafter "system 100"). Referring to FIGS. 1A-1D together, the system 100 includes a clip assembly 101 releasably coupled to a first post 103a which in turn is serially and releasably coupled to a second post 103b (together "posts 103"). As shown in FIG. 1B, the clip assembly 101 includes an upper member 105 and a lower member 107 configured to engage with a mounting ledge 109 (e.g., a ledge protruding from a portion of an airframe or other support structure) by clamping the mounting ledge 109 between the upper and lower members 105 and 107. The clip assembly 101 thereby secures the system 100 in place with respect to the mounting ledge 109. In the illustrated embodiment, the upper member 105 has a rear surface 110 located immediately adjacent to and/or engage the vertical surface 112 of the mounting ledge 109 so as to brace against the mounting ledge to provide substantial stability to the clip assembly 101 and the posts 103 when installed. Accordingly, the interface between the rear surface 110 and the mounting ledge 109 can effectively react torsional loads that may be applied it to the system 100 during use.

The posts 103 extend from the clip assembly 101 and are configured so electrical wires (or other lines) can be fastened to the posts 103. Accordingly, the wires will be securely retained and supported relative to the mounting ledge by the system 100. The posts 103 can be identical and interchangeable. As illustrated, each post includes a plurality of wire engagement members 111 configured to receive an elongated fastener (e.g., a zip-tie or other similar fastener) therethrough that can be used to secure the one or more wires to the post 103. In use, the system 100 is secured to the mounting ledge 109 and a plurality of wires running adjacent to the posts 103 can be secured to one or more of the wire engagement members 111. A plurality of such systems 100 can be spaced apart along a mounting ledge or series of mounting ledges (e.g., along a section of an airframe) so that electrical wires can be supported and secured in position along their lengths.

In the illustrated embodiment, some or all of the components of the system 100 are made with 3D printed polymers using additive manufacturing techniques, for example extrusion techniques such as fused deposition modeling (FDM), also referred to as fused filament fabrication (FFF). Various other 3D manufacturing techniques may be used as desired, for example light polymerized techniques, inkjet head printing, selective laser melting or sintering, laminated object manufacturing, or any other suitable technique. The use of 3D printing to form the components of the system can provide several advantages over conventional approaches such as injection molding. For example, 3D printing provides improved controllability, expanded choice of materials, increased speed and reliability, as well as greater flexibility in adjusting the manufacturing process from one batch to the next. Another benefit of 3D printing is that features of the inner structure of the system can be tightly controlled, as compared to traditional injection molding techniques in which the entire structure is generally uniform in fill and density throughout. With 3D printing, the system can be manufactured to have a non-solid construction with closed internal voids throughout to decrease the weight of the system or to provide additional structural support in desired portions. In some embodiments, characteristics of the materials can vary throughout the components of the system, for example by varying density and/or composition of the polymer or polymer blends throughout. In some embodiments, the materials can include one or more of acrylonitrile butadiene styrene (ABS), Nylon 618, Nylon 645, polylactic acid (PLA), polyethylene terephthalate (PET) (either opaque or transparent base, with or without additives), Nylon with improved printing qualities, or Nylon with aramid fiber reinforcement. The illustrated embodiment is made of a material that satisfies FAA flammability requirements (i.e., non-flammability). In some embodiments, one or more of the materials used to make the components of the system 100 can meet other requirements for aerospace manufacturing compliance, for example non-flammability, vibration resistance, durability, rigidity, etc. In yet other embodiments, the materials may or may not need to meet the same FAA or other aerospace manufacturing compliance requirements. Other embodiments can use other 3D printable materials to provide the components with the desired performance characteristics and/or other properties, including characteristics and/or properties suitable to the installation and associated approval regulations.

Referring to FIGS. 1A-1D, the upper member 105 and lower member 107 of the clip assembly 101 can be separable components joined together by a threaded shaft of the post 103a, as described in more detail below. In some embodiments, the upper member 105 and the lower member 107 are joined together by an elongated tether 108 (omitted from FIG. 1D for purposes of clarity). The upper member 105 includes a lower portion 113 configured to face toward an upper portion 115 of the lower member 107. The lower portion 113 of the upper member 105 includes a first mating surface 117 and a first clamping surface 119. As seen best in FIG. 1D, the first mating surface 117 can be disposed towards one end of the lower portion 113 and the first clamping surface 119 can be disposed towards an opposite end of the lower portion 113. The upper portion 115 of the lower member 107 includes a second mating surface 121 and a second clamping surface 123. The upper member 105 and the lower member 107 are configured, such that when mated together, the first mating surface 117 comes into direct contact with the second mating surface 121 and the first clamping surface 119 faces the second clamping surface 123. When the first and second mating surfaces 117, 121 are in direct contact, the first and second clamping surfaces 119, 123 can be spaced apart from one another by a predetermined gap 125 (FIG. 1B) that is dimensioned to snugly capture a mounting ledge 109 therein, such that the rear surface 110 of the upper member 105 is engaged with or immediately adjacent to the mounting ledge 109 (FIG. 1B). The gap 125 between the first and second clamping surfaces 119, 123 can extend along a lateral portion 127 and a vertical portion 128 so as to receive both a lateral and a vertical portion of the mounting ledge 109. In other embodiments, the dimensions and shapes of the upper and lower members 105, 107 can be configured to receive mounting ledges having other shapes, orientations, and sizes.

The upper member 105 includes a threaded receptacle 129 extending upwardly from the first mating surface 117. The lower member 107 includes an aperture 131 the second mating surface 121 and through the thickness of the lower member 107. The aperture 131 is sized and positioned such that, when the first mating surface 117 and the second mating surface 121 mate together, the aperture 131 is substantially aligned with the threaded receptacle 129. Because the threaded receptacle 129 and the aperture 131 are positioned in the upper and lower members 105 and 107 at the first and second mating surfaces 117, 121, when the post 103a is coupled to the clip assembly 101 the post 103a is spaced laterally away from the mounting ledge 109, which is grasped between the first and second clamping surfaces 119, 123. This arrangement can provide easier manual access to the post 103a when the clip assembly 101 is secured to the mounting ledge 109 as compared to alternative arrangements in which the post is positioned closer to the mounting ledge 109.

The post 103a includes a base 133 and a threaded shaft 135 extending away from the base 133. The base 133 can be substantially a rectangular prism with an upper surface 137, a lower surface 139, and a plurality of side surfaces 141a-d. Each of the side surfaces 141a-d includes two wire engagement members 111 that, as noted above, are configured to receive an elongated fastener (e.g., a zip-tie or other similar fastener) therethrough that can be used to secure a wire or other line running adjacent to the post 103a. The threaded shaft 135 extends from the upper surface 137 of the base 133 and includes a tapered boss 143 that defines a wedging surface at its base.

The threaded shaft 135 is sized and configured to pass through the aperture 131 in the lower member 107 of the clip assembly 101 and to be threadably received within the threaded receptacle 129 of the upper member 105 of the clip assembly 101. In the illustrated embodiment, the mating threads on the threaded shaft 135 and the threaded receptacle 129 can have a customized shape, such as a non-symmetrical cross-sectional shape (i.e., the intersecting faces of each thread are at different angles relative to the longitudinal axis of the shaft or receptacle 135 or 129). For example, one of the intersecting faces of the thread can be approximately at or close to perpendicular to the longitudinal axis of the shaft 135 or receptacle 129, and the other face could non-perpendicular and at an acute angle relative to the longitudinal axis. This customized, non-symmetrical thread shape can provide better retention and thread engagement when the shaft 135 is screwed into and tightened within the receptacle 135. In another embodiment, the mating threads on the shaft 135 and receptacle 129 can have a more conventional, symmetrical cross-sectional shape (i.e., the intersecting faces of the thread are at approximately the same angle relative to the longitudinal axis of the shaft 135 or receptacle 139). When the threaded shaft 135 is tightened within the threaded receptacle 129, the upper surface 137 of the post 103a urges the lower member 107 towards the upper member 105, such that the first mating surface 117 and the second mating surface 121 come into direct contact with each other, and the first clamping surface 119 and the second clamping surface 123 are separated from one another by the gap 125 so as to receive and clamp onto opposing surfaces of the mounting ledge. In some embodiments, the post 103a can be rotated by hand, without the use of tools, to screw the threaded shaft 135 into the threaded receptacle 129. In some embodiments, the boss 143 of the post 103a can include one or more protuberances (not shown) configured to engage corresponding recess(es) (not shown) at the opening or within the threaded receptacle 129. The mating of a protuberance with a corresponding recess can define a locked or final position in which the threaded shaft 135 has been sufficiently inserted into the threaded receptacle 129. In this locked or final position, the side surfaces 141a-d of the post 103a can be substantially parallel to side surfaces of the clip assembly 101, thereby facilitating and ensuring a selected orientation of the post(s) 103 for coupling wires to the wire engagement members 111 when the system 100 is secured in position with respect to a mounting ledge 109.

The first post 103a is configured to releasably connect to the second post 103b so the posts are coaxially aligned and extend away from the clip assembly 101. The second post 103b can be identical and interchangeable with the first post 103a with the threaded shaft extending away from the base. In another embodiment, the first and second posts 103a and 103b can be interchangeable, although one post may be different than the other. For example, the first post 103a may be slightly longer or shorter than the second post 103b to accommodate the installation. The bottom portion of the first post 103a includes a threaded receptacle 145 with a flared opening 147 configured to receive a threaded shaft 149 of the second post 103b therein, such that the tapered boss 151 of the second post 103b mates in a wedging action with the flared opening 147 of the first post 103a. The second post 103b also includes a threaded receptacle therein (not shown) such that an additional post can be mated to the second post 103b in a serial manner and in axial alignment. In some embodiments, the flared opening 147 of the first post 103a includes a recess (not shown) configured to engage with a corresponding protuberance on the boss 151 of the second post 103b to define a locked or final position in which the threaded shaft 149 of the second post 103b has been sufficiently inserted into the second threaded receptacle 145 of the first post 103a. In this locked or final position, the side surfaces 141a-d of the first post 103a can be substantially parallel to or generally coplanar with side surfaces 153a-d of second post 103b. In some embodiments, the system 100 can include three, four, five, six, or more posts coupled in series. In other embodiments, the system 100 can include only a single post coupled to the clip assembly.

FIGS. 2A-2D are perspective, side, top, and bottom views, respectively, of one of the posts 103 of the system 100. Referring to FIGS. 2A-2D together, the post 103a includes the base 133 and threaded shaft 135 extending away from an upper surface 137 of the base 133. The threaded shaft 135 includes a tapered boss 143 at its lower portion where it meets the upper surface 137 of the base 133. Each of the side surfaces 141a-d includes two wire engagement members 111 configured to receive an elongated fastener therethrough. The post 103a also includes the second threaded receptacle 145 with a flared opening 147 that can optionally receive a threaded shaft 149 of a second post 103b (FIG. 1D) therein such that the tapered boss 151 of the second post 103b mates with the flared opening 147 of the first post 103a.

The wire engagement members each include a bar 155 extending over a recess 157 configured to receive at least a portion of a fastening member. Each bar 155 of the illustrated embodiment is substantially horizontally oriented, i.e., parallel to the upper and/or lower surfaces 137, 139 of the post 103a. The recess 157 over which the bar 155 extends can be sufficiently deep to receive a zip-tie or other elongated fastener therethrough. In the illustrated embodiment, the post 103a has two wire engagement members 111 on each of the four side surfaces 141a-d. In other embodiments, the post 103a can have fewer or greater numbers of wire engagement members 111 on each side of the post 103a. In some embodiment, wire engagement members 111 may only be provided on some of the sides of the post but not others. Optionally, the wire engagement members 111 can take other forms, for example an annular ring coupled to and surrounding the post 103a. Various other configurations and arrangements of the wire engagement members 111 can be used as desired.

Figure 1D:
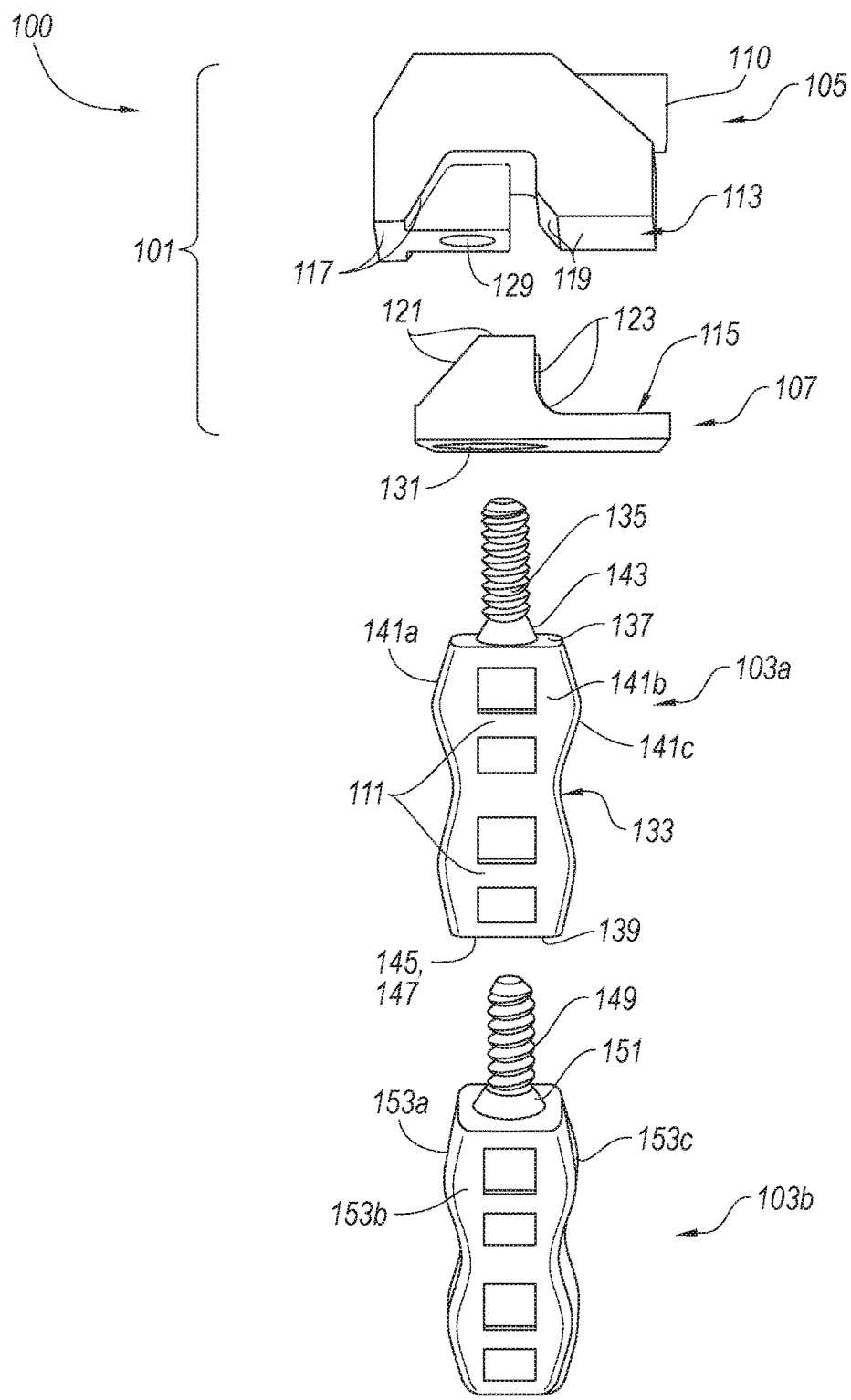
Figure 2A:
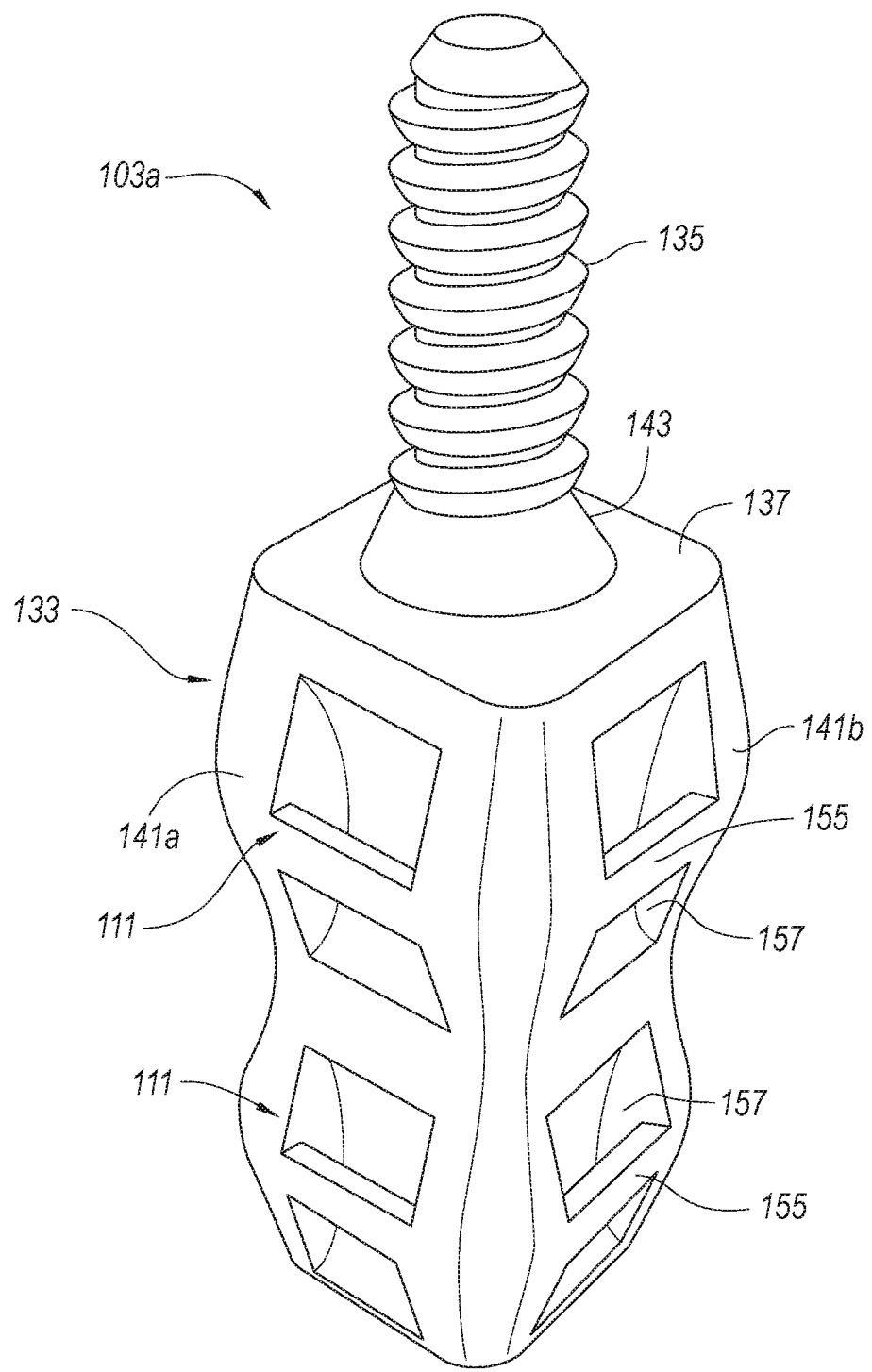
FIGS. 2A-2D are perspective, side, top, and bottom views, respectively, of a post of the electrical wiring installation system shown in FIGS. 1A-1D.
Figure 2B:
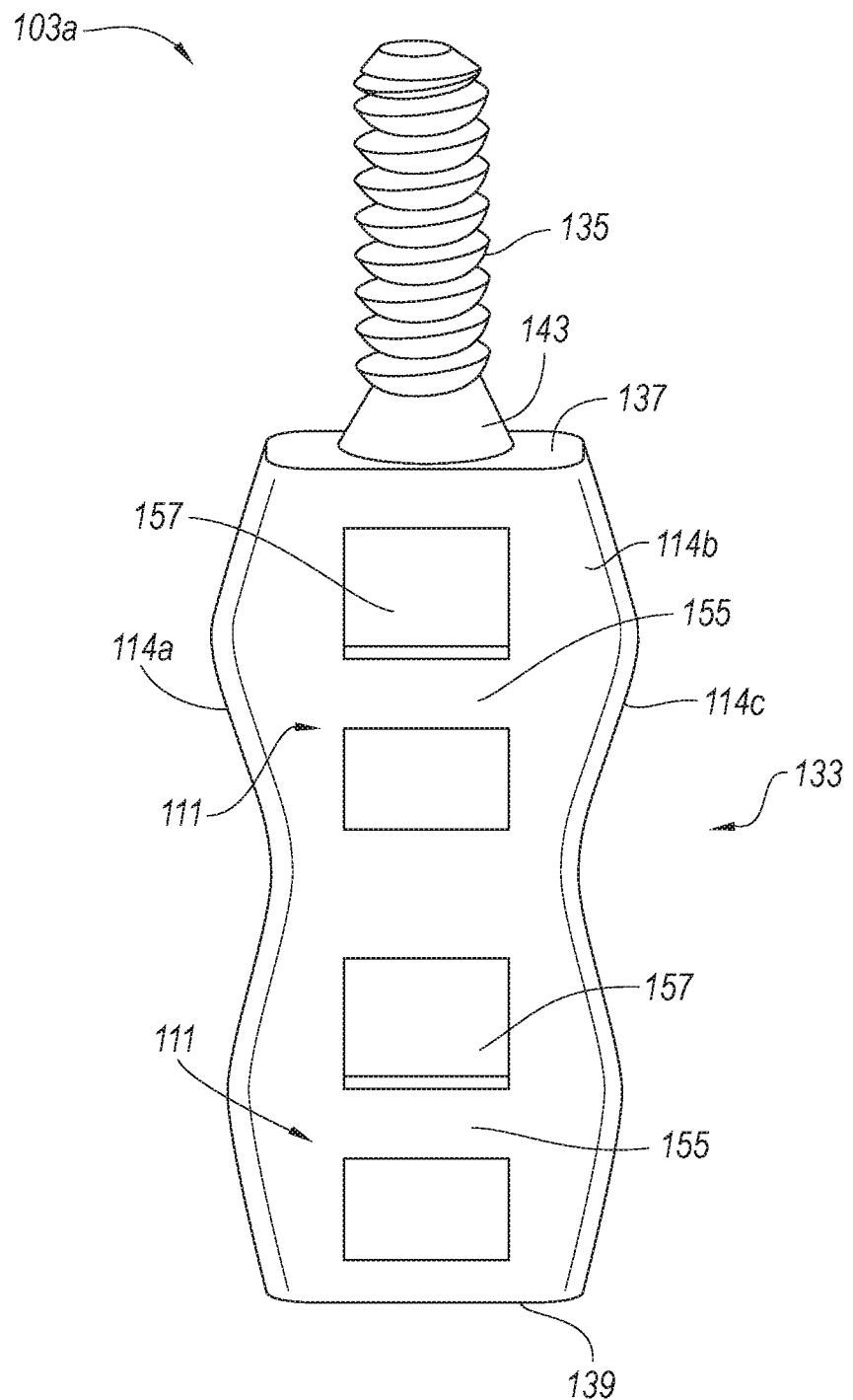
Figure 2C:
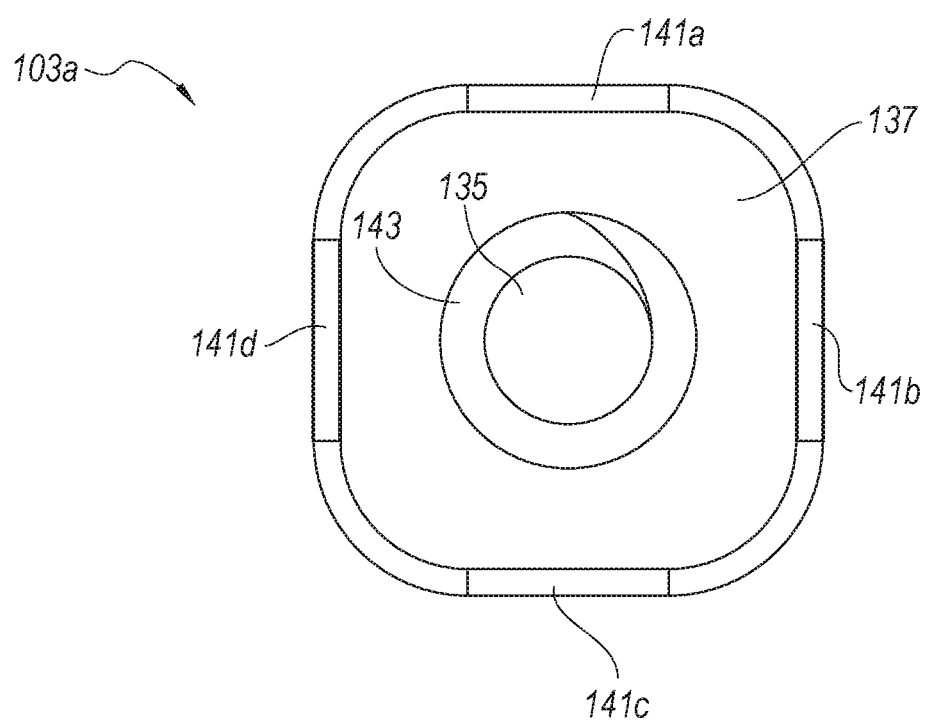
Figure 2D:
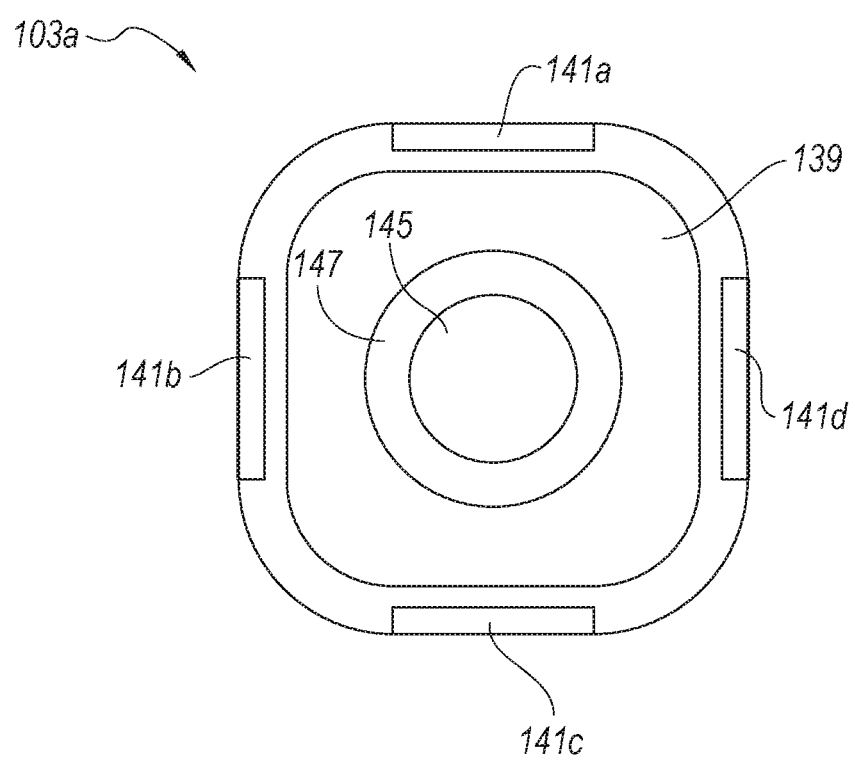
Figure 3A:
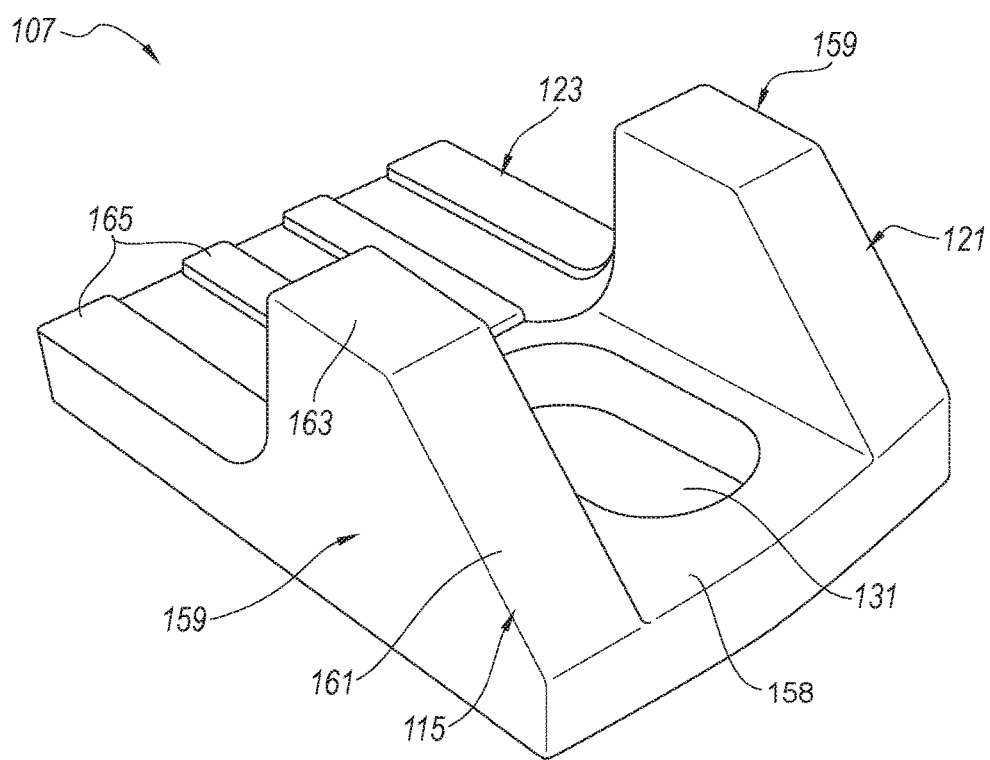
FIGS. 3A-3E are perspective, side, front, top, and bottom views, respectively, of a lower clip assembly member of the electrical wiring installation system shown in FIGS. 1A-1D.
Figure 3B:
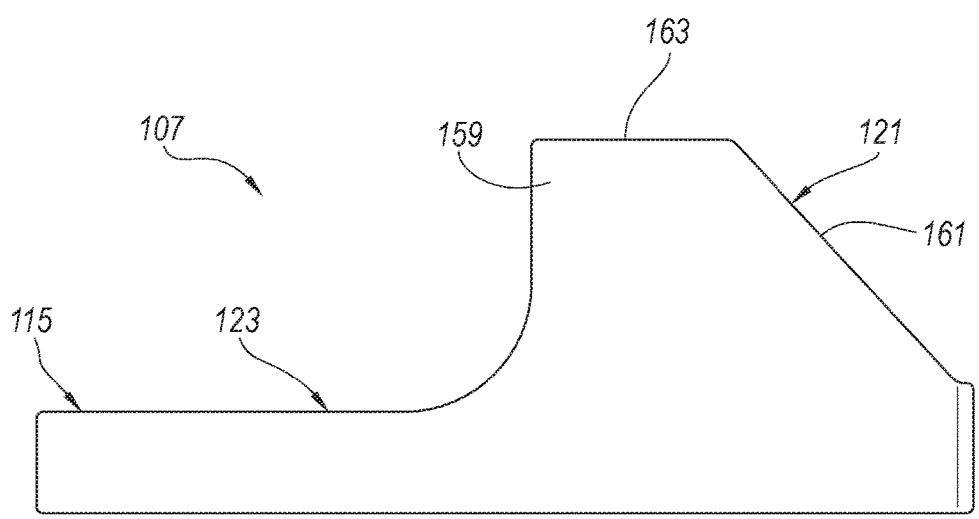
Figure 3C:
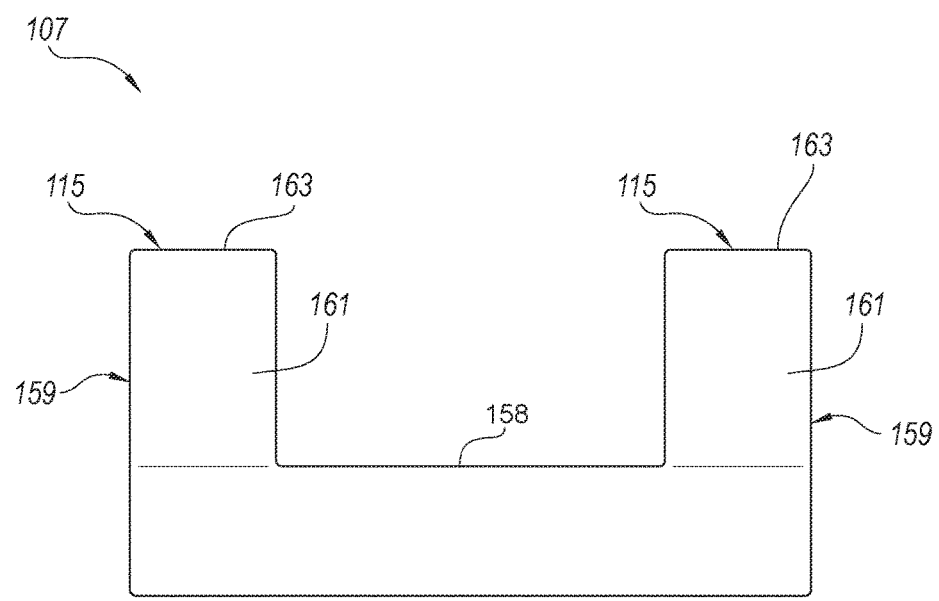
Figure 3D:
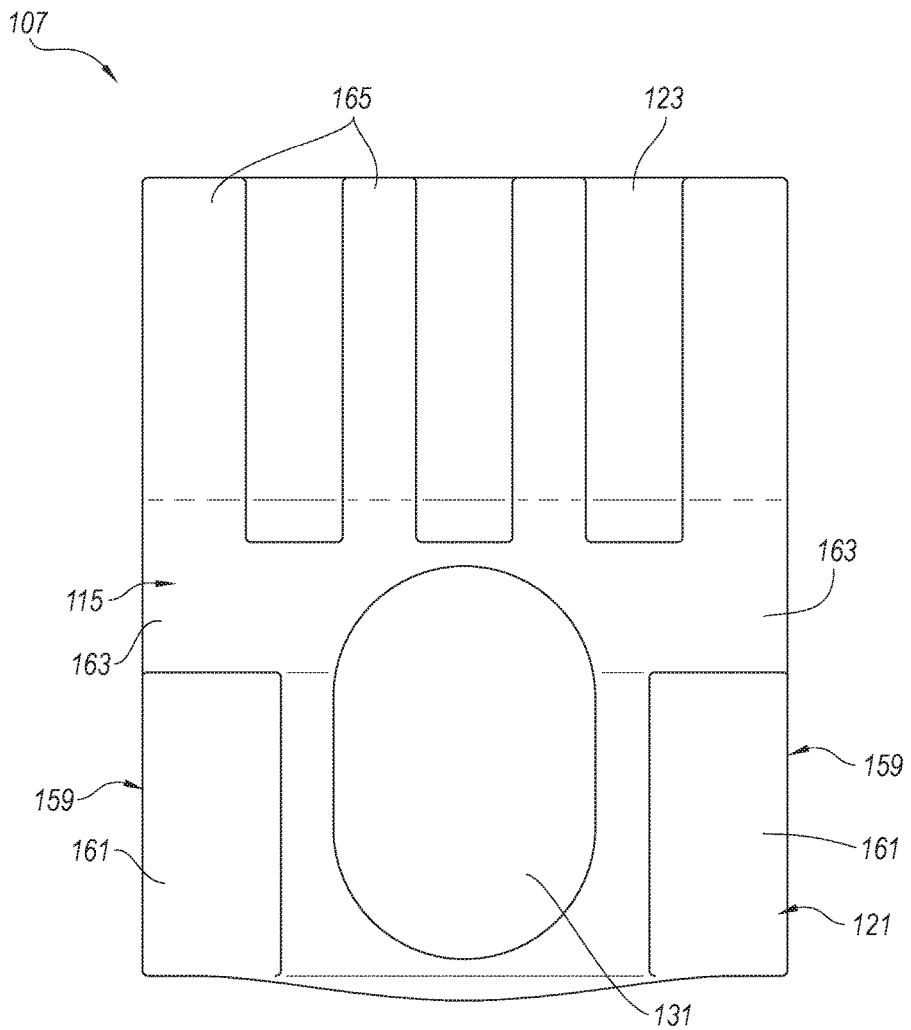
Figure 3E:
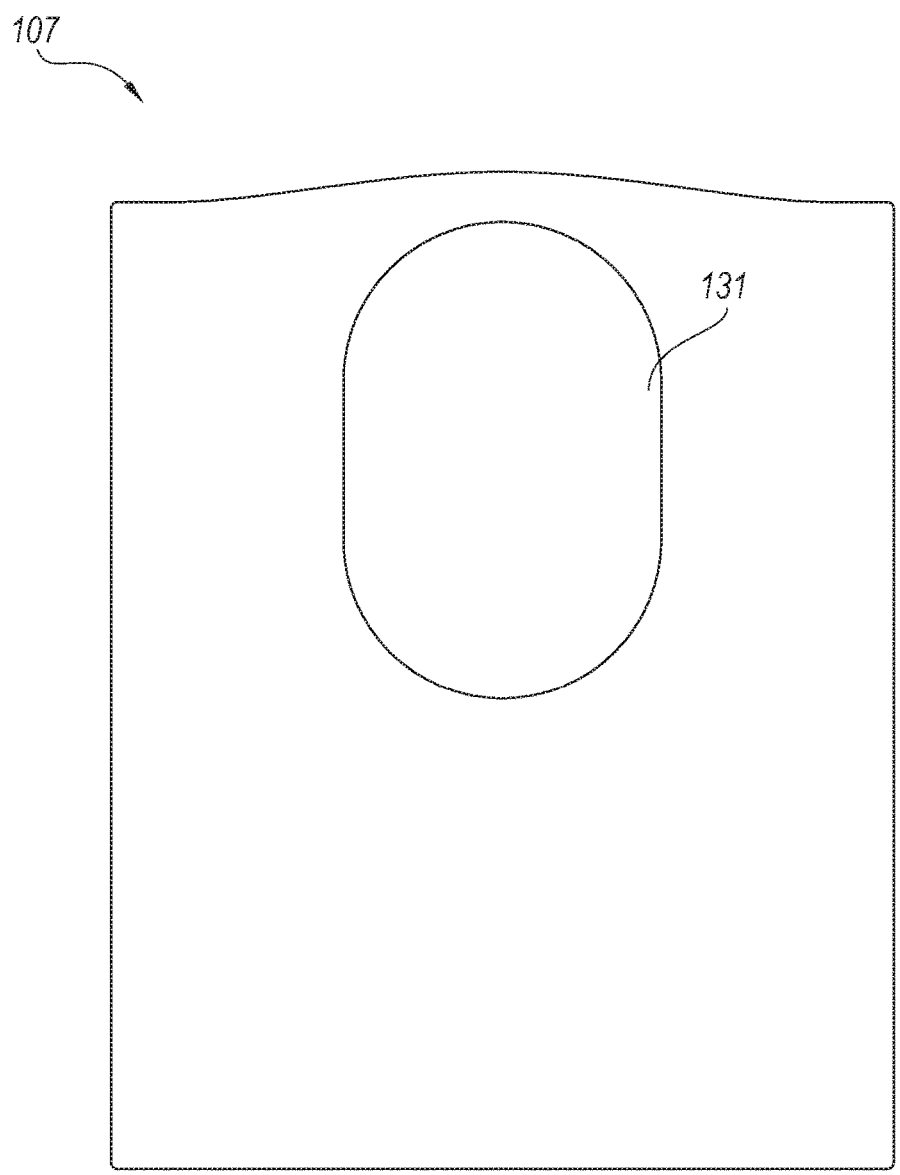

FIGS. 3A-3E are perspective, side, front, top, and bottom views, respectively, of the lower member 107 of the clip assembly 101 shown in FIGS. 1A-1D. Referring to FIGS. 3A-3E together, the lower member 107 includes the upper portion 115 configured to face the lower portion 113 of the upper member 105 (FIG. 1D). The upper portion 115 of the lower member 107 includes the second mating surface 121 and the second clamping surface 123. The aperture 131 is formed in the second mating surface 121 and extends through the thickness of the lower member 107. The second mating surface 121 includes a base portion 158 in which the aperture 131 is formed and two raised wings 159 each with an angled surface 161 and an upper horizontal surface 163. The horizontal surfaces 163 and/or angled surfaces 161 can be ridged so as to engage with corresponding ridges (or other friction-fit features) of the first mating surface 117 of the upper member 105. The angled surfaces 161 are configured to angle downwardly and away from the second clamping surface 123 to facilitate engagement with the upper member 105 as described in more detail below. The second clamping surface 123 can include a plurality of raised features 165 that provide a more secure grip when clamping a ledge (e.g., mounting ledge 109, FIG. 1B).

Figure 4A:
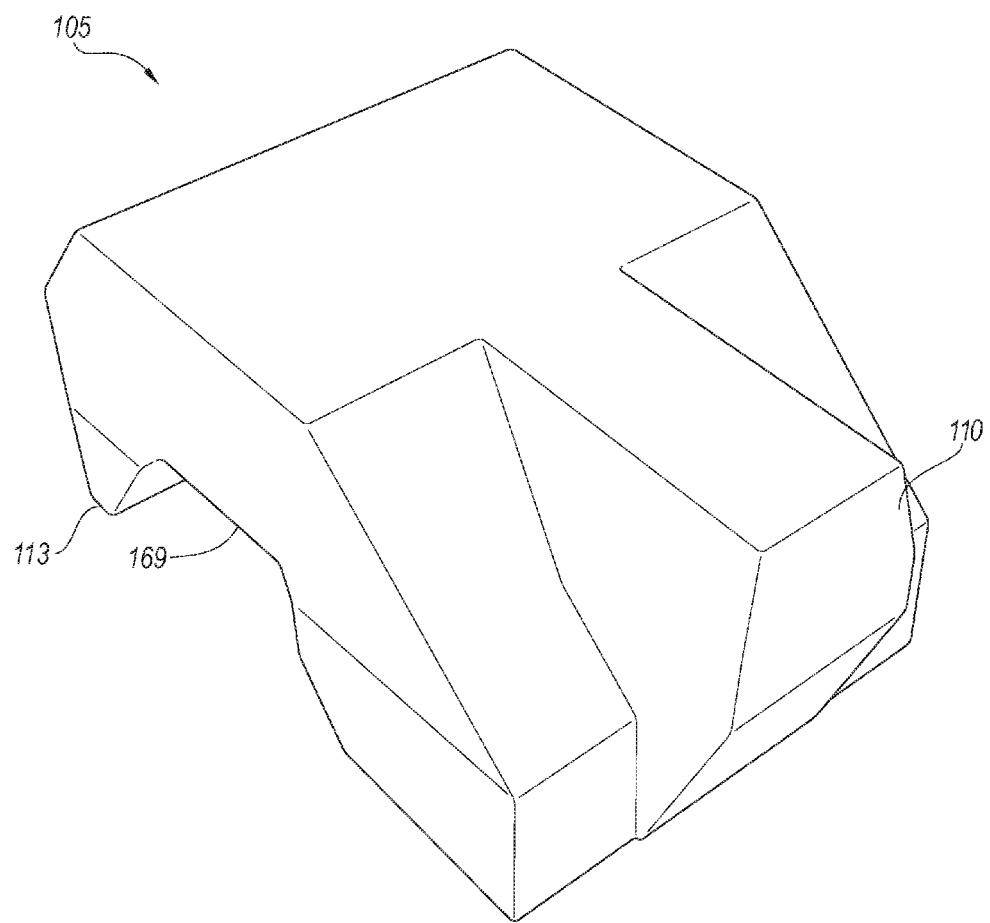
FIGS. 4A-4E are perspective, side, front, top, and bottom views, respectively, of an upper clip assembly member of the electrical wiring installation system shown in FIGS. 1A-1D.
Figure 4B:
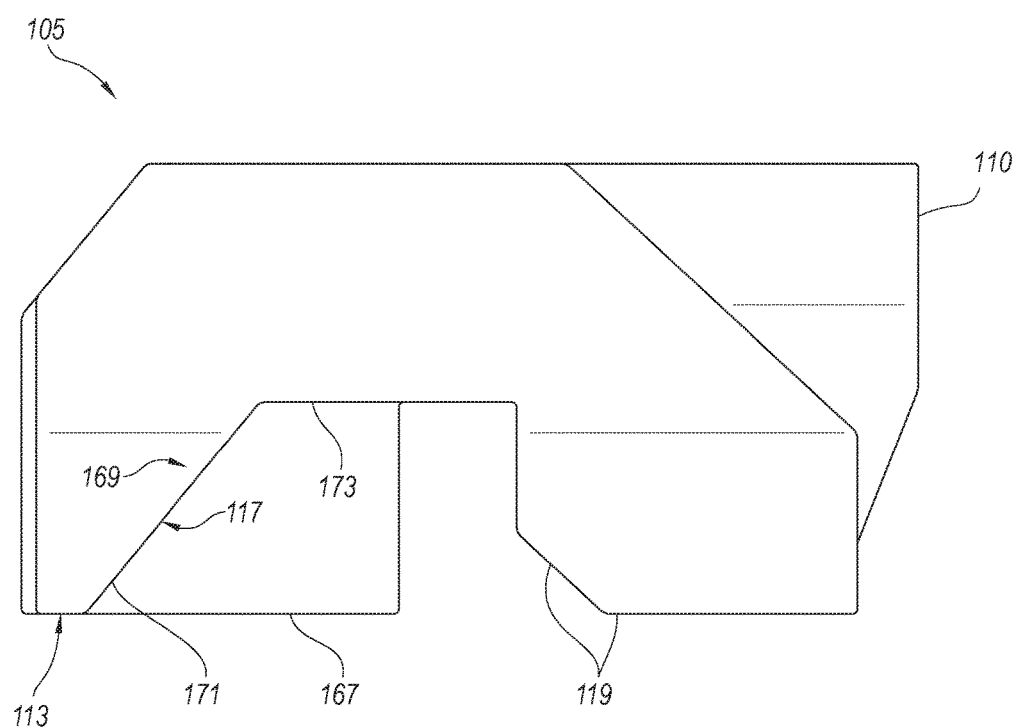
Figure 4C:
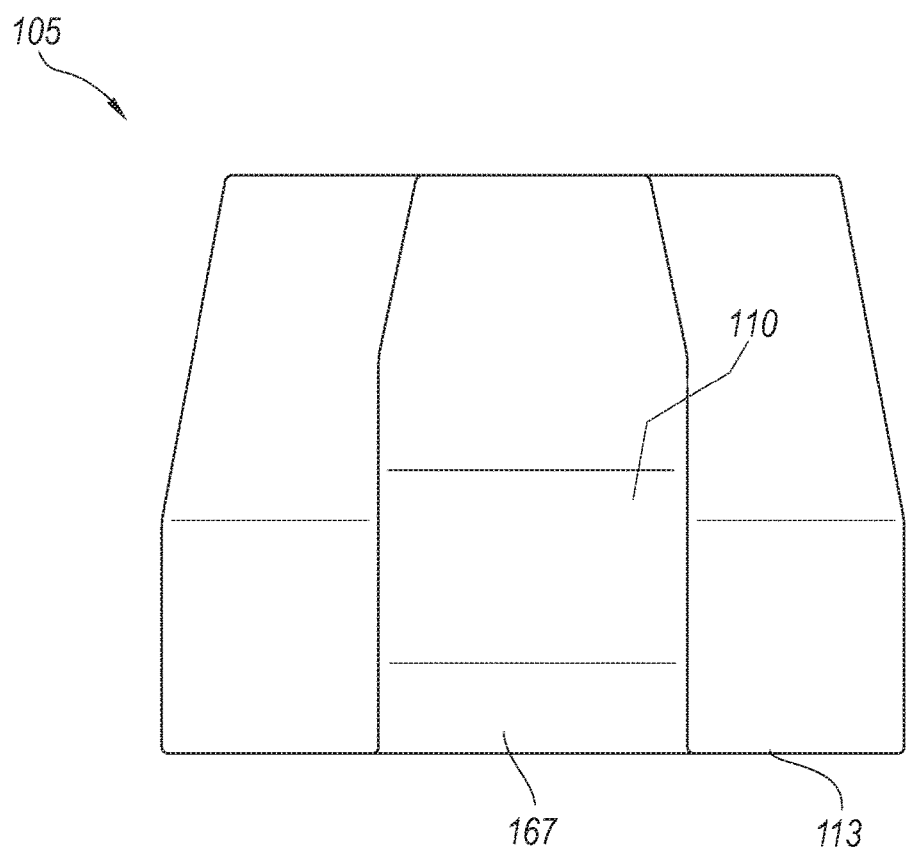
Figure 4D:
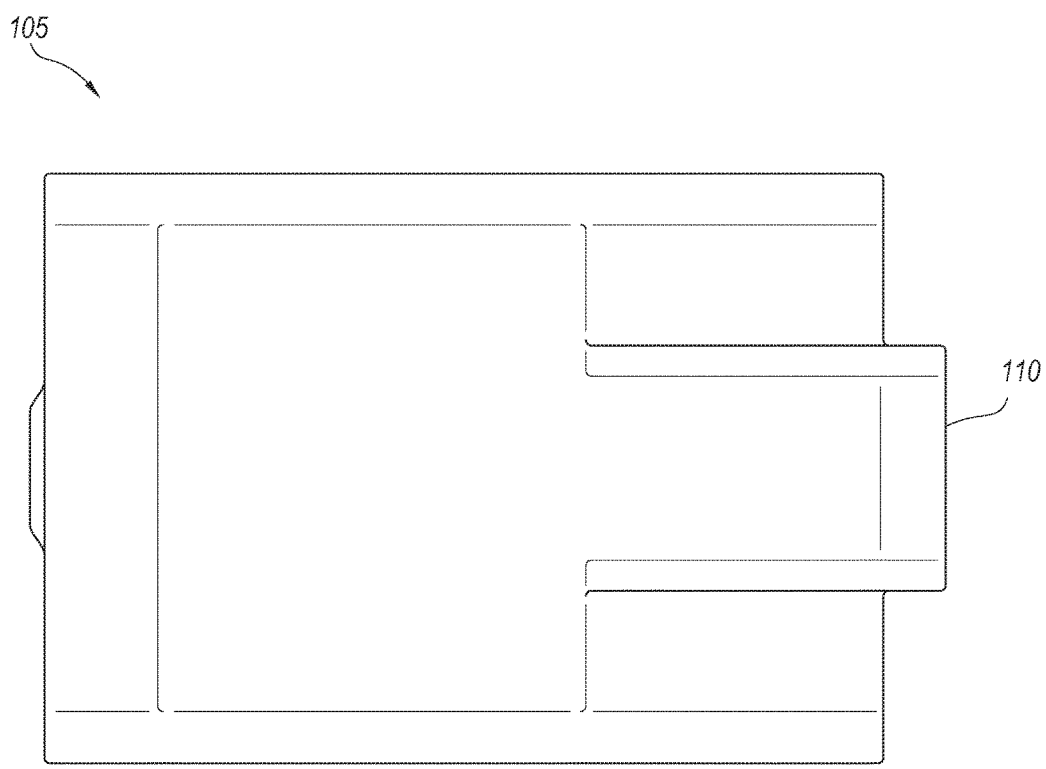
Figure 4E:
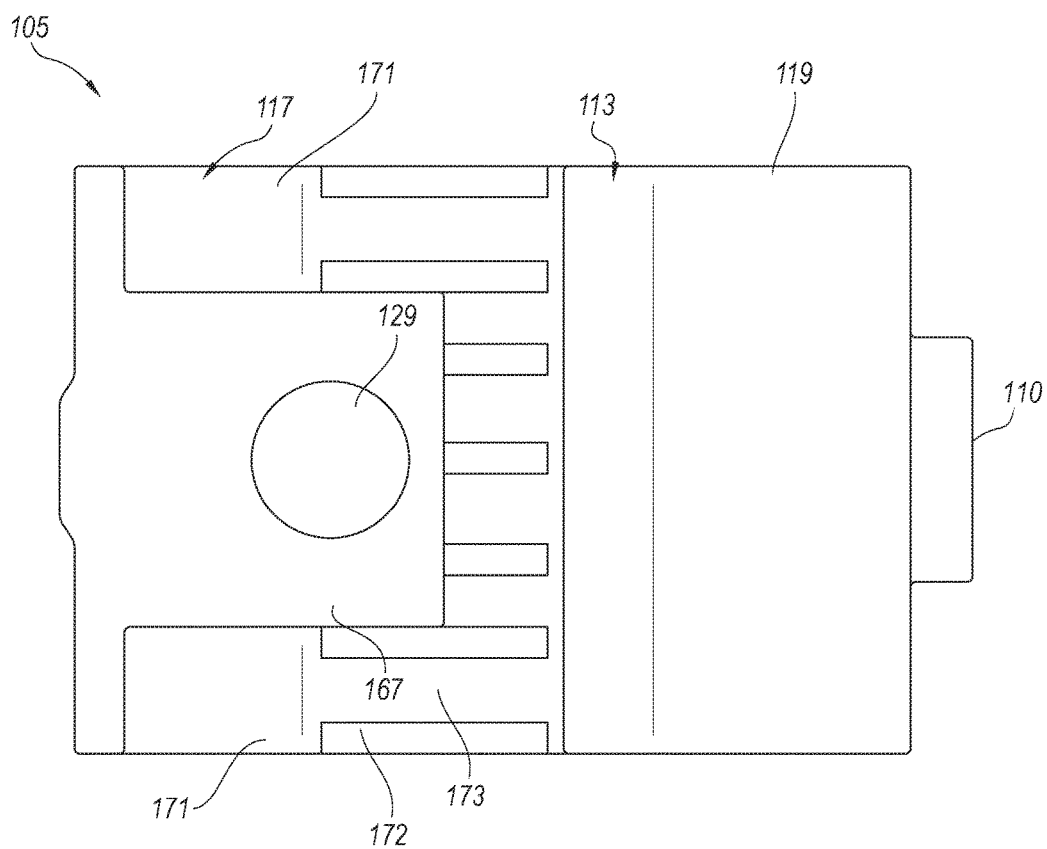

FIGS. 4A-4E are perspective, side, front, top, and bottom views, respectively, of the upper member 105 of the clip assembly 101 shown in FIGS. 1A-1D. Referring to FIGS. 4A-4E together, the upper member 105 includes the lower portion 113 configured to face and engage with the upper portion 115 of the lower member 107 (FIG. 1D). The lower portion 113 of the upper member 105 includes the first mating surface 117 and the first clamping surface 119. The threaded receptacle 129 is formed in the first mating surface 117. The first mating surface 117 includes a base portion 167 in which the threaded receptacle 129 is formed and recesses 169 on opposing sides of the threaded receptacle 129. Each recess 169 includes an angled surface 171 and an upper horizontal surface 173. The horizontal surfaces 173 and/or angled surfaces 171 can be ridged so as to engage with corresponding ridges (or other friction-fit features) of the second mating surface 121 of the lower member 107. For example, ridges 172 are formed along the horizontal surface 173 as shown in FIG. 4E. The first clamping surface 119 can also include a plurality of raised features that provide a more secure grip when clamping a ledge (e.g., mounting ledge 109, FIG. 1B).

The angled surfaces 171 of the upper member 105 and the corresponding angled surfaces 161 of the lower member 107 are configured to angle downwardly and away from the first and second clamping surfaces 119, 123. This orientation facilitates engagement of the upper member 105 and the lower member 107. To join the two, the wings 159 of the lower member 107 are placed at least partially within the recesses 169 of the upper member 105 such that the base portion 158 of the lower member 107 faces the corresponding base portion 167 of the upper member 105. As the first and second mating surfaces 117, 121 are brought closer together, the wings 159 of the lower member 107 are urged into position with respect to the recesses 169 of the upper member 105 such that the horizontal surfaces 163 of the wings 159 of the lower member 107 come into direct contact with the corresponding horizontal surfaces 173 of the recesses of the upper member 105. This positioning also defines the thickness of the gap 125 (FIG. 1B), particularly in the vertical portion 128 of the gap 125. This wedging motion of the corresponding angled surfaces 161, 171 drives the first and second clamping surfaces 119, 123 together across both the vertical portion 128 and the lateral portion 127 of the gap 125.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A line installation system, comprising:
   a clip assembly comprising:
      a first clip member having a first clamping surface and a threaded receptacle; and
      a second clip member having a second clamping surface and an aperture;
      wherein the first and second clip members are mateable with the first clamping surface facing the second clamping surface and the aperture substantially aligned with the threaded receptacle; and a post releasably connectable to the clip assembly to hold the first and second clip members together, the post comprising:
a base having a wire engagement member; and
a threaded shaft extending from the base, the threaded shaft configured to pass through the aperture of the second clip member of the clip assembly and threadably mate with the threaded receptacle of the first clip member of the clip assembly.

2. The system of claim 1 wherein the threaded shaft is configured to pass through the second clip member and threadably mate with the threaded receptacle of the first clip member with at least portions of the first and second clip members spaced apart from each other.

3. The system of claim 1 wherein the first clip member comprises a first mating surface adjacent to the first clamping surface, and wherein the second clip member comprises a second mating surface adjacent to the second clamping surface, such that when the first and second clip members are mated together, the first mating surface and the second mating surface are in direct contact and the first clamping surface and the second clamping surface are spaced apart from one another by a gap configured to receive a mounting ledge therein.

4. The system of claim 3 wherein the threaded receptacle formed in the first mating surface and the aperture is formed in the second mating surface, such that when the clip assembly is engaged with the mounting ledge, the post is spaced laterally away from the mounting ledge.

5. The system of claim 3 wherein the first mating surface and the second mating surface have corresponding angled shapes.

6. The system of claim 3 wherein the first mating surface and the second mating surface are ridged.

7. The system of claim 1 wherein the post is a first post, and further comprising a second post interchangeable with the first post, and wherein the base of the first post comprises a second threaded receptacle configured to receive threaded shaft of the second post therein.

8. The system of claim 7 wherein the second post is substantially identical to the first post.

9. The system of claim 8 wherein a threaded shaft of the second post comprises a tapered boss around a base of the threaded shaft, and wherein the second receptacle of the first post comprises a flared opening at an opening of the receptacle, wherein the tapered boss is configured to securely engage with the flared opening.

10. The system of claim 1 wherein the clamping surface is configured to engage a mounting ledge of an airframe.

11. The system of claim 1 wherein the system is made entirely from a 3-D printed polymer.

12. The system of claim 1 wherein the wire engagement member comprises a bar extending over a recess configured to receive an elongated fastener looped around the bar.

13. The system of claim 1 wherein the post is configured to be mated with the clip assembly without tools.

14. The system of claim 1 wherein at least one of the first clip member, the second clip member, or the post has a non-solid construction with a closed internal void within.

15. A method of retaining an electrical wire in an electrical wiring installation system, the method comprising:
providing a clip assembly comprising:
first and second clip members mateable together, the first clip having a threaded receptacle, and the second clip having an aperture substantially aligned with the threaded receptacle;
providing a post releasably connectable to the clip assembly to hold the first and second clip members together, the post comprising:
a base having a wire engagement member; and
a threaded shaft extending from the base, the threaded shaft configured to pass through the aperture of the second clip member of the clip assembly and threadably mate with the threaded receptacle of the first clip member of the clip assembly to secure the post to the clip assembly and to secure the first and second clip members together; and
mating the first and second clip members together over opposing sides of a mounting ledge;
threading the threaded shaft of the post into the receptacle of the first clip member, thereby securing the post to the clip assembly and securing the first and second clip members together; and
coupling an electrical wire to the post.

16. The method of claim 15 wherein the mounting ledge comprises a portion of an airframe.

17. The method of claim 15 wherein coupling the electrical wire to the post comprises securing a zip-tie around the wire and a wire engagement member of the post.

18. The method of claim 15 wherein threading the threaded shaft of the post into the receptacle of the clip assembly comprises rotating the post into position without the use of tools.

* * * * *